United States Patent
Dittmar (10) Patent No.: US 7,519,601 B2
(45) Date of Patent: Apr. 14, 2009

(54) METHOD AND APPARATUS FOR IMPLEMENTING RECURSIVE REMOTE PROCEDURE CALLS

(75) Inventor: Daniel Dittmar, Berlin (DE)

(73) Assignee: SAP AG, Walldorf (DE)

( * ) Notice: Subject to any disclaimer, the term of this patent is extended or adjusted under 35 U.S.C. 154(b) by 425 days.

(21) Appl. No.: 11/015,775

(22) Filed: Dec. 17, 2004

(65) Prior Publication Data

US 2006/0136431 A1    Jun. 22, 2006

(51) Int. Cl.
    *G06F 17/30* (2006.06)
(52) U.S. Cl. ............... 707/10; 707/2; 707/9; 707/100; 709/224; 717/127
(58) Field of Classification Search ............ 707/1, 707/2, 9, 10, 100; 719/330; 709/224; 717/127
    See application file for complete search history.

(56) References Cited

U.S. PATENT DOCUMENTS

| | | | | |
|---|---|---|---|---|
| 5,615,337 A | * | 3/1997 | Zimowski et al. ............. 707/3 |
| 5,832,219 A | * | 11/1998 | Pettus ........................ 709/203 |
| 5,873,086 A | * | 2/1999 | Fujii et al. .................... 707/10 |
| 5,956,509 A | * | 9/1999 | Kevner ........................ 719/330 |
| 6,324,683 B1 | * | 11/2001 | Fuh et al. ..................... 717/124 |
| 6,546,425 B1 | * | 4/2003 | Hanson et al. ............... 709/227 |
| 6,907,414 B1 | * | 6/2005 | Parnell .......................... 706/47 |
| 2003/0066053 A1 | * | 4/2003 | Al-Azzawe ................. 717/127 |
| 2003/0070005 A1 | * | 4/2003 | Mukundan et al. .......... 709/330 |
| 2004/0006563 A1 | * | 1/2004 | Zwiegincew et al. .......... 707/10 |
| 2004/0068479 A1 | * | 4/2004 | Wolfson et al. ................ 707/1 |
| 2004/0199636 A1 | * | 10/2004 | Brown et al. ................. 709/227 |

* cited by examiner

*Primary Examiner*—Hosain T Alam
*Assistant Examiner*—Syling Yen
(74) *Attorney, Agent, or Firm*—Buckley, Maschoff & Talwalkar LLC (57) ABSTRACT

A system, method, apparatus, means and computer program code for operating a database server are provided including receiving a database request message, the database request message including a user-defined extension (UDE) portion to be processed by a UDE server, transmitting a procedure request to the UDE server based on the UDE portion of the database request message, and determining if a response received from the UDE server is a reply to the procedure request before closing a call stack associated with the database request message.

12 Claims, 5 Drawing Sheets

METHOD AND APPARATUS FOR IMPLEMENTING RECURSIVE REMOTE PROCEDURE CALLS

FIELD

Embodiments of the present invention relate to database systems. More specifically, some embodiments relate to systems and methods for implementing recursive remote procedure calls in database systems.

BACKGROUND

Many database systems allow the use of additional user-defined functions, procedures or routines (generally referred to herein as "user-defined extensions" or "UDE") to call or invoke routines that run in a separate process. As one illustrative example (to be used throughout this disclosure), some structured query language (SQL) database systems allow users to create or define procedures or routines to extend the functionality of the SQL system. In some SQL database systems, the routines are created in an object-oriented programming language such as C/C++. The routines are compiled and identified to the database system as new functions or procedures so that the database system will recognize the new function. This allows the UDE function to be invoked similar to a native SQL database function. For example, when a UDE function is invoked, the database server may cause a separate UDE process or UDE server to be run to perform the function.

The utility of these user-defined extensions can be further enhanced by allowing them to recursively interact with the database server. For example, an initial SQL database request may invoke a first UDE function (thereby causing a separate process to run). The UDE function may in turn request services from the database server. In some situations, the database request may consist of a call to a stored procedure invoking a further UDE function. Unfortunately, when the UDE server or process communicates with the database server to request services, a new session object is typically created (as well as a new call stack to track the new session). That is, for every level of recursion, current systems create a new session object (and a new call stack). The creation of each new session object and call stack can impair system performance and reduce the number of available stacks and memory.

It would be desirable to provide improved systems and methods for implementing recursive remote procedure calls.

SUMMARY

Pursuant to some embodiments, a system, method, apparatus, means and computer program code for operating a database server are provided including receiving a database request message, the database request message including a user-defined extension (UDE) portion to be processed by a UDE server, transmitting a procedure request to the UDE server based on the UDE portion of the database request message, and determining if a response received from the UDE server is a reply to the procedure request before closing a call stack associated with the database request message.

Pursuant to some embodiments, an intermediate message is received from the UDE server, and is determined to not be a reply to the procedure request. The intermediate message is recursively processed without creating a new call stack.

Pursuant to some embodiments, the procedure request is formatted in a data packet including a tag. Pursuant to some embodiments, the response received from the UDE server is formatted as a data packet including a second tag, wherein the response is a reply to the procedure request if the second tag indicates that the response is a procedure reply and the procedure request-is the next open procedure in the call stack.

With these and other advantages and features that will become hereafter apparent, a more complete understanding of the nature of the invention can be obtained by referring to the following detailed description and to the drawings appended hereto.

DETAILED DESCRIPTION

To alleviate problems inherent in the art, embodiments of the present invention introduce systems, methods, computer program code and means for implementing recursive remote procedure calls. For convenience, clarity and ease of exposition, a number of terms are used herein. For example, the term "server" is used to refer to software configured to perform tasks in response to requests from a "client". One or more servers may be implemented on a given computing device (for example, as both the UDE server and the database server described below may be implemented on the same or different devices).

Features of embodiments of the present invention may be used in any of a number of different types of systems, including, for example, database systems. For example, applicant has discovered that features of embodiments provide desirable results when used in conjunction with a SQL database system allowing the use of user-defined extensions or functions. To illustrate features of some embodiments of the present invention, reference is first made to FIG. 1 where an illustrative database system 100 is shown. Database system 100 may be, for example, a SQL database system. Database system 100 includes a client 102, a database server 104 and a UDE server 106.

Figure 1:
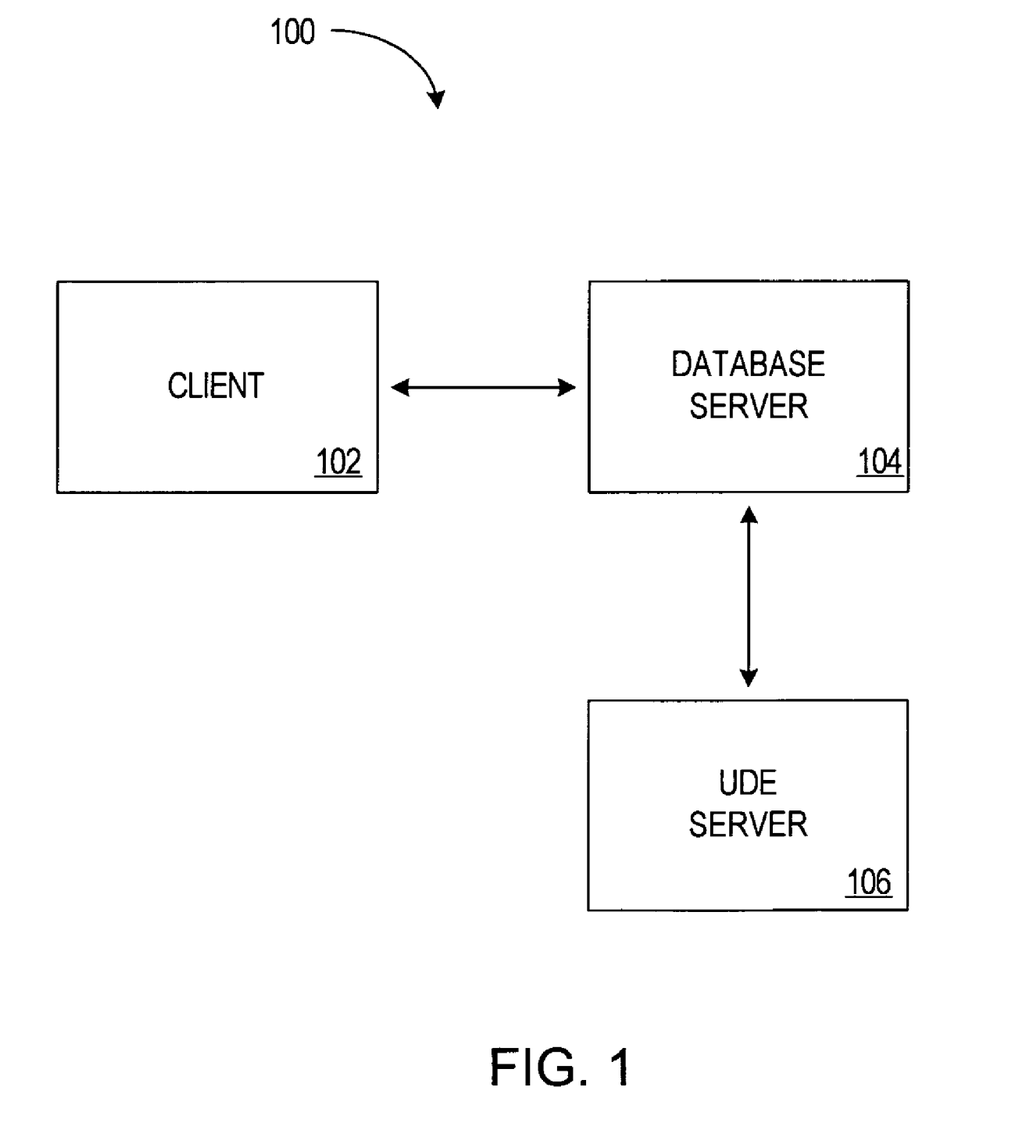
FIG. 1 is a diagram of a system according to some embodiments.

Client 102 includes software configured to allow one or more users or applications to interact with database server 104 to submit queries and receive database responses. As a simple example, client 102 may be a computing device (such as a personal computer) operating Internet browser software (such as Microsoft's Internet Explorer®)) to interact with database server 104 over a network connection by submitting SQL queries to database server 104 and by receiving responses from the database server 104.

Database server 104 may consist of a number of elements (not shown) interacting to create databases, store data, and respond to queries, including, for example, a database application program, a database kernel, one or more data volumes, or the like. In general, database server 104 receives a database request from client 102 and responds to the request. Pursuant to some embodiments, a request received from client 102 may include one or more user-defined portions (each a "UDE" as used herein) that requires database server 104 to refer each UDE portion to a separate process or server such as the UDE server 106.

In some embodiments, UDE server 106 is a component or process separate from database server 104 and may be or include, for example, a library of executable functions or objects callable by database server 104. In some embodiments, one or more data tables in database server 104 may include references to one or more UDE functions. For example, a reference to a particular element of a data table may invoke a function or object stored in UDE server 106. UDE functions may also be invoked based on a database request submitted by client 102 to database server 104 (e.g., the database request may be a SQL statement including a reference to a UDE function).

Pursuant to some embodiments, UDE server 106 and database server 104 communicate by exchanging data packets formatted using the TCP/IP format, although those skilled in the art will appreciate that other formats and communication protocols may also be used. The two servers communicate in a "ping pong" fashion, where each request has a corresponding response.

When database server 104 receives a database request from client 102, server 104 parses the request to identify any functions and identify any UDE portion. Server 104 creates a call stack to manage processes and calls associated with processing the database request. If the database request includes a UDE portion, a procedure request is transmitted as a packet to UDE server 106 which processes the request. If the request is a simple one (e.g., that can be directly responded to by UDE server 106 without reference to another source such as database server 104), a reply to the procedure request is transmitted as a packet to database server 104. Database server 104 then prepares a response to the database request and transmits the response to client 102.

Pursuant to some embodiments, each packet exchanged between database server 104 and UDE server 106 includes a tag, flag, code, or other designator (referred to generally herein as a "tag"). As will be described further below, each packet's tag is used by the component receiving the packet to determine the nature of the contents of the packet. For example, a tag may designate whether a packet contains a reply to a pending request or a new request.

This information is used to ensure that a recursive request (or other intermediate requests during processing of a database request) to either the database server 104 or to the UDE server 106 does not result in the creation of a new communication channel between the two servers. Instead, recursive requests enter the receiving server at the location where the server is waiting for a reply, leaving the server's call stack intact. Recursive calls are thus implemented using machine recursion, even if some of the pending calls reside in another process. In this manner, embodiments provide improved processing efficiency in systems implementing recursive procedure calls.

For simplicity, only several components of database system 100 are shown in FIG. 1; those skilled in the art will appreciate that a database system typically may include a number of other components including, for example, I/O devices, drivers, APIs, and the like. Database server 104 and UDE server 106 may be implemented on the same or separate computing devices, including any of a number of computing devices commonly used in the art. For the purpose of illustration but not limitation, embodiments may be implemented on Intel® x86 processor based computing devices running a version of Microsoft Windows® or LINUX.

For the purpose of illustration, but not limitation, database server 104 may be the MaxDB® system offered by mySQL AB and SAP AG, Inc. of Walldorf Germany, and UDE server 106 may include one or more executable objects compiled from C/C++ or other programming languages. While the system 100 of FIG. 1 only shows a single client 102, database server 104 and UDE server 106, those skilled in the art will recognize that database system 100 may include a number of clients interacting with one or more database servers interacting with one or more UDE servers.

Figure 2:
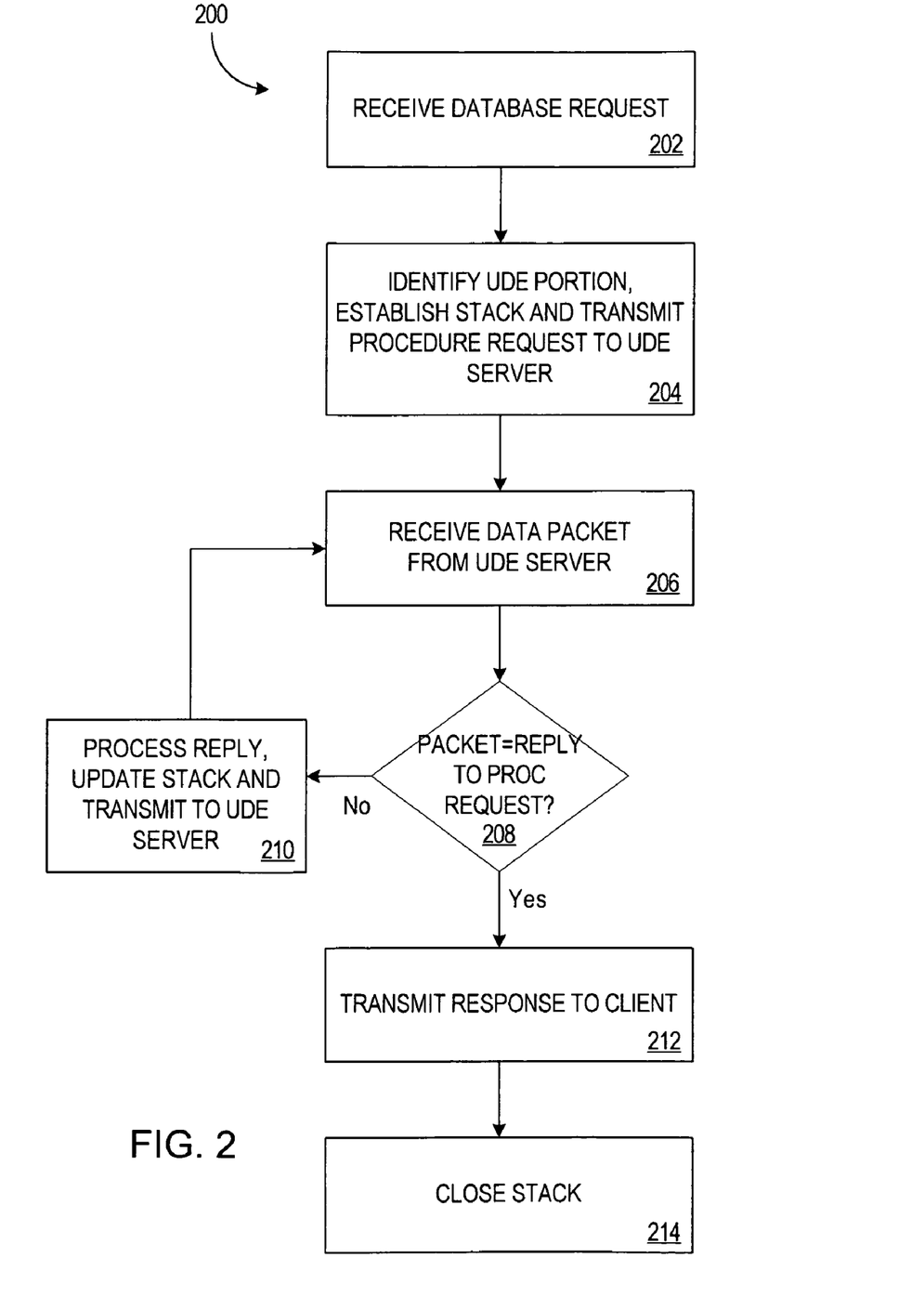
FIG. 2 is a flow diagram illustrating process steps to implement recursive remote procedure calls according to some embodiments.

Reference is now made to FIG. 2 where a flow diagram is shown depicting a process 200 for implementing recursive procedure calls pursuant to some embodiments. Process 200 may be performed, for example, by or via a computing device. More particularly, as shown, process 200 is performed by the database server 104 interacting with other components of database system 100 of FIG. 1. This flow chart (and the process diagrams of FIGS. 3-5) do not imply a fixed order to the steps, and embodiments of the present invention may be performed in any order that is practicable.

Process 200 begins at 202 where database server 104 receives a database request from a client such as client 102 of FIG. 1. As discussed above, the database request may be received from any of a number of different types of clients. For example, the database request may be received from a user operating a computing device to submit the database request to database server 104 via a Web browser over a network connection. An application program may also generate the database request and transmit the request to database server 104. In either event, in some embodiments, the database request is a SQL request including one or more commands or functions. Further, the database request received at 202 includes a UDE portion representing a user-defined function or command that has been implemented in the database system.

Once database server 104 has received the database request, processing continues at 204 where the database server 104 manipulates or parses the database request to identify the UDE portion. For example, each user-defined function used in conjunction with a database system may be identified in a function table accessible by database server 104. Each database request received by database server 104 may be parsed to identify functions or commands, including any UDE portions. In the event that a database request does include a UDE portion, database server 104 operates to establish a call stack associated with the UDE procedure, and transmits a procedure request message to a UDE server (e.g., such as UDE server 106 of FIG. 1).

Pursuant to some embodiments, the procedure request message is transmitted as a data packet including a tag identifying the data packet as a procedure request. The particular procedure is identified by additional data that is part of the data packet. For example, pursuant to some embodiments, the following set of tags may be used to identify the different kind of packets: (1) a SQL request; (2) a SQL reply; (3) a procedure request (or a "proc/UDE request"); and (4) a procedure reply (or a "proc/UDE reply"). Embodiments may use this set of tags to identify and control remote recursive procedure calls. Those skilled in the art will appreciate that other tags, tag names, or tag structures may be used.

Once the procedure request data packet has been transmitted to UDE server 106, processing continues at 206 where a data packet is received from UDE server 106. This data packet includes a tag and may include any of a number of different messages, including a reply to the procedure request message sent at 204 or a database request from the UDE server. In any event, processing continues at 208 where a determination is made whether the data packet received from UDE server 106 is a reply to the procedure request message sent at 204. Pursuant to some embodiments, the determination at 208 may be made by comparing the tags associated with the procedure request packet and the data packet received from UDE server 106 to match the procedure reply to the most recent (or innermost, when viewed from the context of the call stack) open procedure request.

If the determination at 208 confirms that the packet received at 206 is a reply to the procedure request sent at 204, processing continues to 212 where the database server 104 completes its processing and transmits a database response message to the client (e.g., by returning the data or message responsive to the client's original database request). Processing completes at 214 with the closure of the call stack established at 204.

If, on the other hand, processing at 208 confirms that the packet received at 206 is not a reply to the procedure request, processing continues to 210 where database server 104 takes steps to process the reply packet. For example, if the reply packet received at 206 is a database request (e.g., a SQL database request), database server 104 recursively calls the code to handle the database request. Processing at 210 does not require the creation of a new call stack; instead, the call stack established at 204 is updated to include the new procedure call. Database server 104 creates a reply packet and sends the reply packet to the UDE server 106. The process repeats the flow through 206, 208 and 210 until a determination is made that the packet received from the UDE server 106 was a reply to the original procedure request transmitted at 204, at which time the process concludes with database server 104 transmitting the database response to the client and closing the stack.

Multiple recursion is possible. That is, a procedure request may cause database server 104 to loop through processing at 206, 208, and 210 multiple times before completion. For example, a particular reply packet received at 206 may be the result of a recursive remote procedure call. For example, this may occur in the situation where a previous reply packet included a database request which caused the database server 104 to perform another UDE call, and the reply packet received at 206 is a result of the other UDE call. Embodiments match replies by the (reverse) order in which the requests were opened and by identifying the content of a packet by its tag (e.g., which specifies whether a packet contains a procedure reply rather than a recursive database request). Further examples will be provided below in conjunction with a discussion of FIGS. 3-5.

Figure 3:
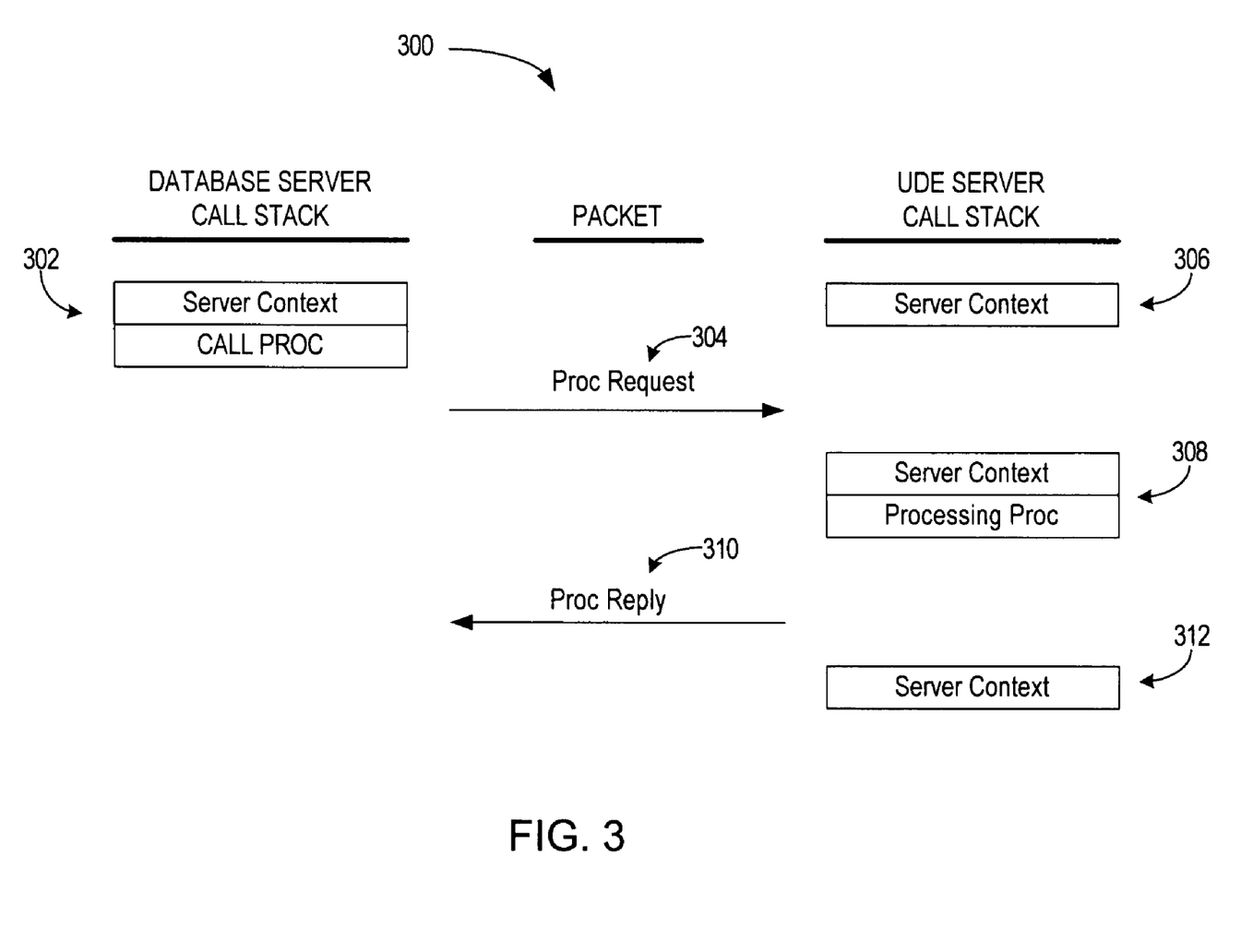
FIGS. 3-5 are process diagrams illustrating processing of various procedure calls according to some embodiments.

Referring now to FIG. 3, a process diagram 300 is shown depicting the call stacks managed by the database server (such as database server 104 of FIG. 1) and the UDE server (such as the UDE server 106 of FIG. 1), and the message traffic between the two servers in conjunction with processing a single database request received by the database server from a client. FIG. 3 represents the relatively simple case where the database request from the client results in a single procedure call from the database server to the UDE server. For example, the database request, received as a SQL request, includes a UDE portion which caused the database server to generate a procedure request 304 message and send it to the UDE server. The procedure request 304 message is formatted as a packet and includes a tag identifying the message as a procedure request. Upon generating the procedure request 304, the database server creates a call stack to manage the procedure. As shown, the call stack includes a stack frame associated with the procedure request.

The UDE server receives a procedure request 304 and creates a call stack to manage its processing of the request (shown as 308). Code of the UDE server operates to respond to the procedure request 304 and a procedure reply 310 message is generated and transmitted back to the database server. The procedure reply 310 is formatted as a packet and includes a tag identifying the message as a reply to the procedure request 304. In some embodiments, the same tag may be used. Upon sending the procedure reply 310, the UDE server updates the stack as shown at 312.

The database server receives the procedure reply 310, checks the tag and confirms that the reply 310 is a reply to the original procedure request 304, and completes its response to the original database request received from the client. The stack is taken down and is available for the next procedure.

Figure 4:
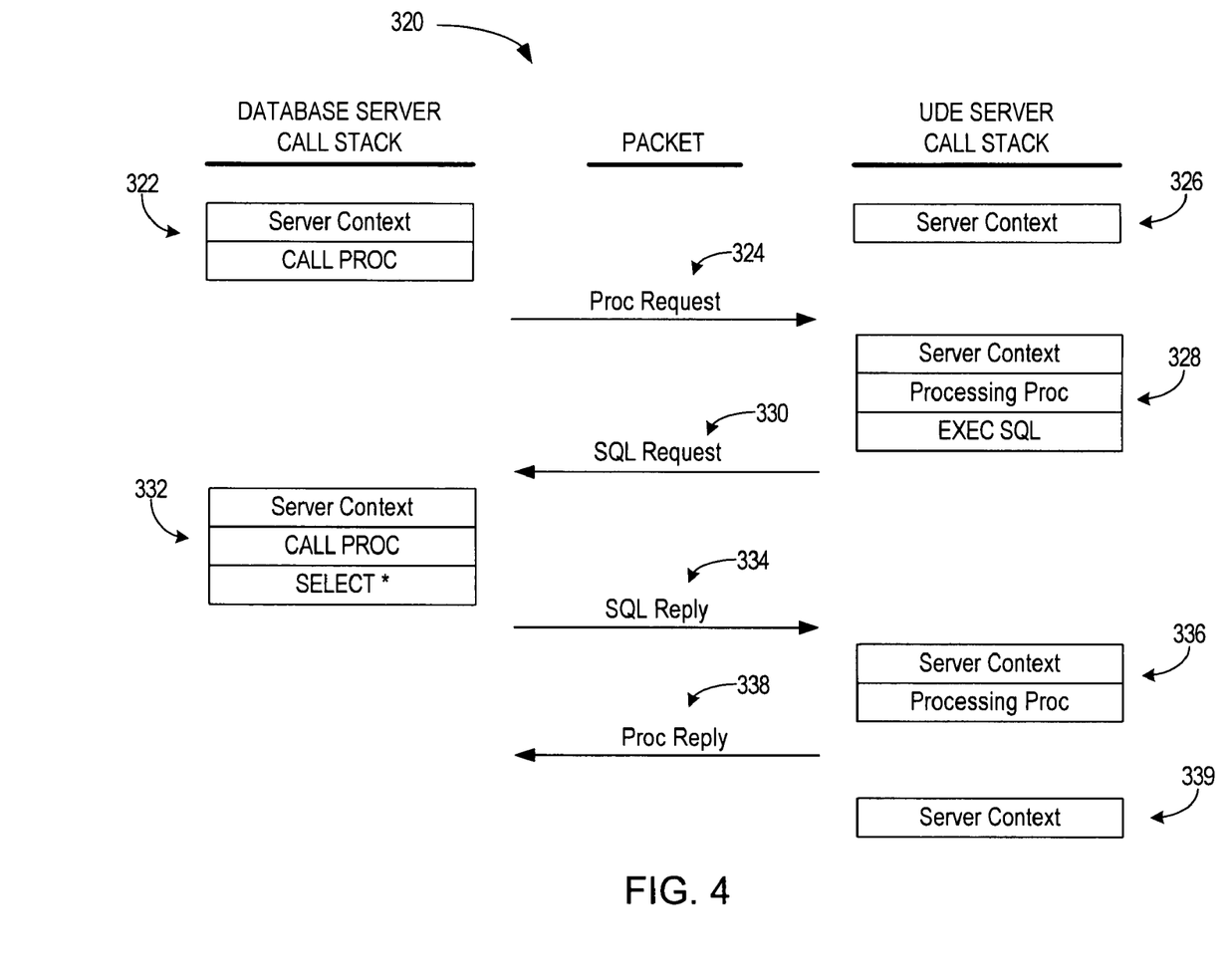

Referring now to FIG. 4, a process 320 is shown depicting a more complicated interaction including a procedure call with a SQL database request from the UDE server. As with the process of FIG. 3, the process starts when a database request is received. The database request includes a UDE portion which caused the database server to generate a procedure request 324 message and send it to the UDE server. The procedure request 324 is formatted as a packet and includes a tag identifying the message as a procedure request. Upon generating the procedure request 324, the database server creates a call stack 322 to manage the procedure. As shown, the call stack includes a stack frame associated with the procedure request.

The UDE server receives a procedure request 324 and creates a call stack to manage its processing of the request (shown as 326). Code of the UDE server operates to respond to the procedure request 324. In this example, processing the procedure request 324 by the UDE server causes the generation of a SQL database request, and a SQL request message 330 is created and transmitted to the database server for further processing. The SQL request message 330 is formatted as a packet and includes a tag identifying the message as a new SQL request message.

The database server receives the SQL request message 330, checks the tag to determine that the message 330 is not a reply to the procedure request 324, updates the call stack 332, and processes the SQL request (here, the SQL command in the request message was a SELECT * command). Pursuant to some embodiments, the database server does not create a new session or a new call stack for this SQL request; instead, the same stack is used. A SQL reply message 324 is created and the results of the SELECT * command are transmitted back to the UDE server for further processing. UDE server updates the call stack 336, processes the response, and transmits a procedure reply 338 message back to the database server to complete processing. Again, the stacks of the UDE server and database server are updated for each recursive process (no new stacks are created), and each message is identified by a tag, allowing each server to identify whether a message is a reply message. If a message is a reply, it is processed as a reply to the innermost request on the stack. Once all of the requests on the stack have been completed, the recursive process is complete.

Figure 5:
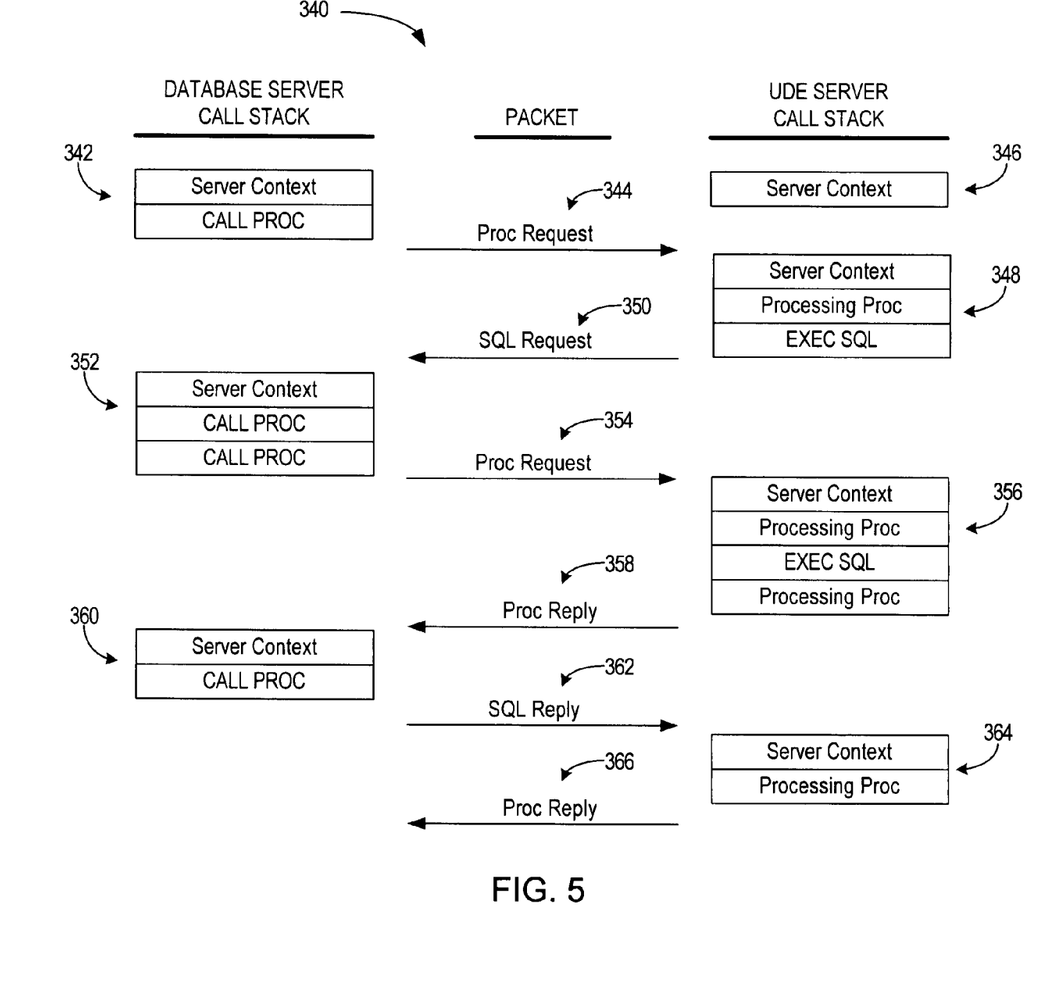

Referring now to FIG. 5, a process 340 is shown depicting processing of a database request which causes recursive interaction between the database server and the UDE server, including a procedure call with a SQL database request from the UDE server that triggers the transmission of a further procedure request to the UDE server. As is shown, embodiments allow such multiple levels of recursion without requiring the creation of new call stacks for each level of recursion, thereby improving processing efficiency and reducing overhead.

Again, processing is initiated with the receipt of a database request which includes a UDE portion, causing the database server to generate a procedure request 344 message and send it to the UDE server. The procedure request 344 is formatted as a packet and includes a tag identifying the message as a procedure request. Upon generating the procedure request 344, the database server creates a call stack to manage the procedure. As shown, the call stack includes a stack frame associated with the procedure request.

The UDE server receives a procedure request 344 and creates a call stack to manage its processing of the request (shown as 348). Code of the UDE server operates to respond to the procedure request 344. In this example, processing the procedure request 344 by the UDE server causes the generation of a SQL database request, and a SQL request message 350 is created and transmitted to the database server for further processing. The SQL request message 350 is formatted as a packet and includes a tag identifying the message as a new SQL request message. The UDE server does not create a new call stack for this SQL request; instead, the same stack is used.

The database server receives the SQL request message 350, checks the tag to determine that the message 350 is not a reply to the procedure request 344, updates the call stack 352, and processes the SQL request. In this example, the SQL request causes the database server to retrieve a further UDE function (e.g., the SQL request may have caused the database server to refer to a database location containing a UDE function). The database server operates to create a further procedure request 354 message (containing a tag differentiating the request 354 from the request 344), updates the stack, and transmits the procedure request 354 to the UDE server for processing. The UDE server updates the call stack 356, processes the UDE function, and generates a procedure reply 358 for transmission back to the database server.

The database server receives the procedure reply 358 message, identifies that it is not a reply to the procedure request 344 (by comparing tags), updates the call stack 360, and processes the reply to generate a SQL reply 362 message that is transmitted back to the UDE server.

UDE server receives the SQL reply 362 message, updates the stack 364, and completes processing of the procedure request 344. The results of processing are transmitted to the database server via procedure reply 366 which has a tag identifying it as the reply to the procedure request 344. The database server closes the stack and sends a response to the database request to the entity or device which originally requested it.

Although the present invention has been described above with respect to some embodiments thereof, it should be noted that the above-described embodiments may be altered to create completely or partially different embodiments without departing from the spirit and scope of the appended claims.

What is claimed is:

1. A computer-implemented method for operating a database server, the method comprising:
   receiving a database request message by a database server from a client, the database request message including a user-defined extension (UDE) portion to be processed by a UDE server;
   generating a procedure request by the database server, the procedure request formatted as a packet including a tag identifying the procedure request;
   establishing a call stack by the database server associated with the procedure request;
   transmitting the procedure request from the database server to the UDE server based on the UDE portion of the database request message;
   receiving the procedure request by the UDE server;
   establishing a call stack by the UDE server to manage processing of the procedure request received by the UDE server;
   determining if a response received from the UDE server by the database server is a procedure reply in response to the procedure request, the determining based on a comparison of the tag of the procedure request and a tag identifying the procedure reply;
   updating the call stack of the database server and the call stack of the UDE server in the instance the determination concludes the response received from the UDE server is not the procedure reply in response to the procedure request and is for an intermediate process between the database server and the UDE server to process the intermediate process;
   closing the call stack of the database server and the call stack of the UDE server in the instance the determination determines the response received from the UDE server by the database server is the procedure reply in response to the procedure request, the procedure reply formatted as a packet and including the tag identifying the procedure reply; and
   outputting a database reply to the client in the instance the determination concludes the response received from the UDE server is the procedure reply in response to the procedure request.

2. The method of claim 1, wherein the determining further comprises:
   determining that the procedure request is the next procedure request on said call stack.

3. The method of claim 1, further comprising:
   generating a response to the database request message, the response based on the reply.

4. The method of claim 1, further comprising:
   determining that the procedure reply is not a complete reply.

5. The method of claim 1, wherein the determining further comprises:
   identifying a tag associated with the intermediate message; and
   determining that the intermediate message is not a procedure reply message.

6. The method of claim 1, wherein the intermediate process includes a SQL database request and recursively processing the SQL database request.

7. The method of claim 6, wherein the SQL database request causes the database server to transmit a further procedure request to the UDE server, the further procedure request transmitted without creating a new call stack.

8. A database system, comprising:
   a memory storing processor-executable process instructions;
   an interface for receiving a database request message from a client device; and
   at least a first processor in communication with the memory and operative in conjunction with the stored process instructions to:
   process the database request message to identify a user-defined extension (UDE) portion to be processed by a UDE server;
   generate a procedure request by a database server, the procedure request formatted as a packet including a tag identifying the procedure request;
   establish a call stack associated with the database request message to track the procedure request based on the UDE portion;
   transmit the procedure request to the UDE server;
   receive the procedure request by the UDE server;

establish a call stack by the UDE server to manage processing of the procedure request received by the UDE server;

determine if a response received from the UDE server by the database server is a procedure reply in response to the procedure request, the determining based on a comparison of the tag of the procedure request and a tag identifying the procedure reply;

update the call stack of the database server and the call stack of the UDE server in the instance the determination concludes the response received from the UDE server is not the procedure reply in response to the procedure request and is for an intermediate process between the database server and the UDE server to process the intermediate process;

closing the call stack of the database server and the call stack of the UDE server in the instance the determination determines the response received from the UDE server by the database server is the procedure reply in response to the procedure request, the procedure reply formatted as a packet and including the tag identifying the procedure reply; and output a database reply to the client in the instance the determination concludes the response received from the UDE server is the procedure reply in response to the procedure request.

9. The database system of claim 8, wherein the at least first processor is further operative in conjunction with the stored process instructions to:

identify a SQL database request in the intermediate process, includes recursively processing the SQL database request.

10. A medium storing processor-executable instructions when executed by a computer to perform the stored instructions, the medium comprising:

instructions to process a database request message to identify a user-defined extension (UDE) portion to be processed by a UDE server;

instructions to generate a procedure request by a database server, the procedure request formatted as a packet including a tag identifying the procedure request;

instructions to establish a call stack associated with the database request to track the procedure request based on the UDE portion;

instructions to transmit the procedure request to the UDE server;

instructions to receive the procedure request by the UDE server;

instructions to establish a call stack by the UDE server to manage processing of the procedure request received by the UDE server;

instructions to determine if a response received from the UDE server by the database server is a procedure reply in response to the procedure request, the determining based on a comparison of the tag of the procedure request and a tag identifying the procedure reply;

instructions to update the call stack of the database server and the call stack of the UDE server in the instance the determination concludes the response received from the UDE server is not the procedure reply in response to the procedure request and is for an intermediate process between the database server and the UDE server to process the intermediate process;

instructions to close the call stack of the database server and the call stack of the UDE server in the instance the determination determines the response received from the UDE server by the database server is the procedure reply in response to the procedure request, the procedure reply formatted as a packet and including the tag identifying the procedure reply; and instructions to output a database reply to the client in the instance the determination concludes the response received from the UDE server is the procedure reply in response to the procedure request, wherein the instructions stored on the processor-executable medium are executed by a processor.

11. The medium according to claim 10, further comprising:

instructions to receive an intermediate message from the UDE server;

instructions to determine that the intermediate message is not a procedure reply to the procedure request; and instructions to recursively process the intermediate message without creating a new call stack.

12. The medium according to claim 10, the process instructions further comprising:

instructions to establish a second call stack associated with processing the procedure request by the UDE server;

instructions to process the procedure request by the UDE server; and instructions to close the second call stack upon completion of processing the procedure request by the UDE server.

* * * * *